Dec. 10, 1968

R. NEUSCHOTZ 3,415,301

SELF-ALIGNING THREADED ELEMENTS

Filed Dec. 13, 1967

ROBERT NEUSCHOTZ
INVENTOR.

BY William P. Green
ATTORNEY

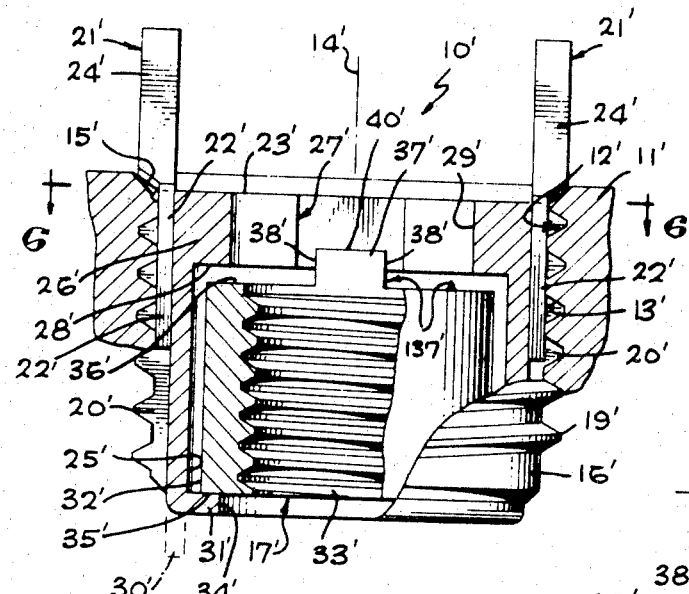

United States Patent Office 3,415,301
Patented Dec. 10, 1968

3,415,301
SELF-ALIGNING THREADED ELEMENTS
Robert Neuschotz, 1162 Angelo Drive,
Beverly Hills, Calif. 90210
Continuation-in-part of applications Ser. No. 524,055 and
Ser. No. 524,086, Feb. 1, 1966. This application Dec. 13,
1967, Ser. No. 690,184
20 Claims. (Cl. 151—23)

ABSTRACT OF THE DISCLOSURE

A self-aligning threaded stud assembly, or threaded insert assembly, including an outer hollow body and an element mounted at least partially within and shiftable relative to the body, with the shiftable element having threads for engagement with a coacting member. The outer body has a flange projecting radially inwardly at the axially outer end of the body, and engageable with the element to transmit axial load forces from the element to the body. The flange contains a notch into which a lug formed on the element projects to retain the element against rotary motion.

*Cross reference to related applications.*—This application is a continuation-in-part of two co-pending applications, specifically application Serial Number 524,055, filed February 1, 1966, on "Shiftable Threaded Stud," now abandoned, and application Serial Number 524,086, filed February 1, 1966, on "Self-Aligning Threaded Inserts," now abandoned.

*Background of the invention.*—This invention relates to threaded fastener assemblies, and particularly to certain improvements in self-aligning threaded studs and inserts. More specifically, the fastener assemblies of the invention are of a type having an outer hollow body adapted to be connected into a carrier part or parent material, and a threaded element mounted to the body for lateral or transverse self aligning shifting movement, so that the element may automatically align itself for proper engagement in any of different positions with another threaded part to which the assembly is to be connected.

Though numerous types of self-aligning threaded fasteners have been devised in the past, most of these prior devices have been limited in their usefulness, and have been more expensive and difficult to manufacture than would be desired. Further, many of these prior assemblies have been of such construction as to necessarily occupy a relatively great transverse dimension within the carrier part, as compared with the size of the actual threads themselves, to thus preclude use of the device in many instances in which the carrier part is not dimensioned to allow sufficient space for reception of the assembly. Additionally, it has been difficult with some prior devices to assure effective transmission of both axial and rotary load forces from the shiftable inner element to the outer body while still allowing free shifting movement of the former in self aligning manner. As a result, there have been many instances in the past in which it would be desirable to employ a self aligning fastener, but in which the previously developed fasteners of this type have not been capable of practical use under all of the circumstances ensuing.

*Summary of the invention.*—The self-aligning fasteners of the present invention provide improved means for transmitting rotary and axial load forces from the threaded inner element to the outer body of the device very positively and effectively, and yet by an interfitting relationship between the two parts resulting in maximum simplification of the overall structure, and minimization of cost. To attain these results, the outer body has near its axially outer end a radially inturned flange, which presents a stop surface against which a shoulder or axially directed surface formed on the shiftable element is engageable in a relation limiting axially outward movement of that element. Also provided at the location of these engaging surfaces are interfitting means for preventing rotation of the threaded element relative to the outer body, and including at least one lug formed on the threaded element and movably received within a notch or recess provided in the flange of the body. The lug or lugs extend axially outwardly beyond the first mentioned surfaces which limit axial movement of the shiftable element. Preferably, the engaging stop surfaces or shoulder surfaces which limit axially outward movement of the shiftable element are disposed substantially directly transversely of the axis of the device, to facilitate the shifting movement of the threaded element without altering its orientation relative to the body during such shifting movement.

When the shiftable element is an externally threaded stud, this element is so formed as to have a shank portion which projects in an axially outward direction from and beyond the body of the device, to carry the external threads, and with this element having also a transversely enlarged portion which is mounted within the body, and is free for shifting movement relative thereto. The interfitting portions of the stud and body, for transmitting load forces therebetween, are formed at essentially the juncture of the mentioned shank and enlargement portions of the stud element, with the enlargement being engageable against the previously mentioned inturned flange on the body to very effectively retain the stud against axially outward movement relative to the body. The lug or lugs which transmit rotary forces to the body extend alongside the shank, and project radially outwardly therefrom into loosely fitting engagement within the notches in the flange of the body.

When the shiftable element is an internally threaded nut or insert, rather than an externally threaded stud, the nut has an essentially tubular side wall which contains at its axially outer end at least one notch extending through the radial thickness of the side wall of the nut element, and defining a load transmitting surface for engagement with the inturned flange of the outer body. The rotary force transmitting lug or lugs extend axially beyond this axial load transmitting surface, and fit into a notch or recess in the flange in interfitting relation.

An additional feature of the invention relates to the provision of yielding means in the devices acting to urge the threaded element axially relative to the body, in a manner preventing cocking or tilting movement of the threaded element. For this purpose, I may employ a spring located at the axially inner end of the threaded element, and urging it axially outwardly to the limit of its permitted movement in that direction.

*Brief description of the drawings.*—The above and other features and objects of the invention will be better understood from the following detailed description of the typical embodiments illustrated in the accompanying drawings, in which:

FIG. 5 is the partially elevational and partially axial sectional view of a self aligning insert or nut constructed in accordance with the invention;

FIG. 6 is a section taken primarily on line 6—6 of FIG. 5, but partially broken away;

FIG. 7 is a view similar to FIG. 5 but showing the insert after it has been locked in position within the carrier part, and as its nut element appears when in use;

FIG. 8 is a fragmentary transverse section taken on line 8—8 of FIG. 7; and

FIG. 9 is a view similar to a portion of FIG. 7, but showing another variational form of the invention.

Figure 1:
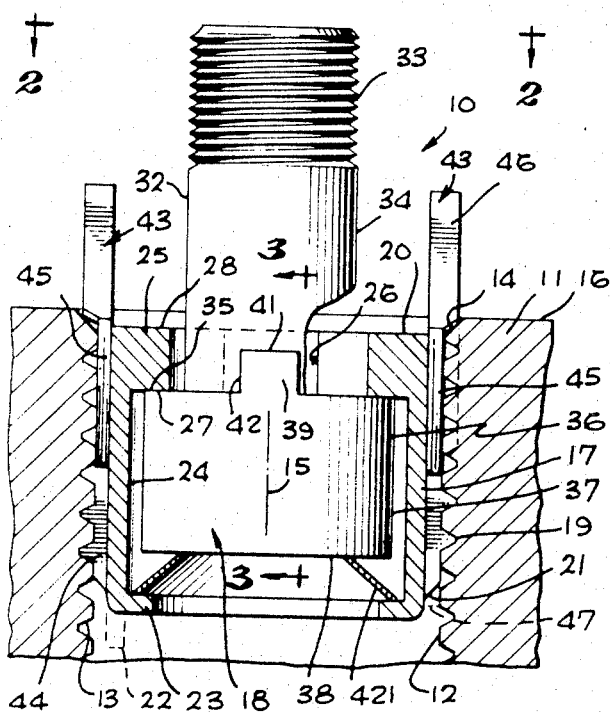
FIG. 1 is an axial section through a self-aligning stud assembly constructed in accordance with the invention.

*Description of the preferred embodiments.*—In FIG. 1, I have designated generally by the number 10 a first form of self-aligning stud assembly constructed in accordance with the invention, as the assembly appears after being screwed into a carrier part 11. This carrier part contains a passage 12 having internal threads 13 into which assembly 10 is screwed, with a tapering frusto-conical countersink surface 14 being formed at the outer end of the passage 12. Threads 13 and countersink surface 14 are centered about an axis 15 which is desirably perpendicular to outer planar surface 16 of the carrier part.

The stud assembly 10 includes an outer essentially tubular hollow body 17, containing and movably mounting a shiftable stud element 18. Body 17 has external threads 19 shaped and dimensioned in correspondence with threads 13 of the carrier part, to screw into those carrier part threads. The threads 19 of body 17 extend along substantially the entire axial extent of the outer surface of the body, from the upper or axially outer transverse planar end surface 20 of the body to a location 21 near the lower end of the body. Beneath the location 21, the tubular side wall of the body may initially have a straight cylindrical downwardly projecting configuration as illustrated in broken lines at 22 in the left portion of FIG. 1, this cylindrical wall being centered about axis 15, but with the lower portion of the cylindrical wall being annularly turned or deformed radially inwardly during assembly of the device to form an annular inturned flange 23 disposed transversely of axis 15. This lower portion of the side wall of body 17 may be of reduced thickness, as shown, downwardly beyond the location 21, to facilitate deformation of the side wall radially inwardly in forming flange 23.

Upwardly above flange 23, the outer body 17 of the assembly has an internal cylindrical wall surface 24 disposed about axis 15, and terminating upwardly at the location of a radially inwardly projecting flange 25 formed at the upper end of body 17. This upper flange 25 is annular except for the provision of two diametrically opposite notches 26 at which the flange 25 is interrupted. At its axially inner or under side, flange 25 forms a stop surface or shoulder 27 which desirably extends directly transversely of axis 15. At its radially inner side, flange 25 is defined by and forms an inner cylindrical surface 28, forming an opening through which the stud 18 projects upwardly. As will be apparent from the drawing, surfaces 27 and 28, as well as transverse upper surface 20 of the flange, are all annular except insofar as they are interrupted by the two notches 26, and the surfaces 27, 28 and 20 are all of course centered about axis 15.

The two notches 26 extend axially through flange 25, and each is defined by two parallel planar axially extending side wall surfaces 29, and a radially outer partial cylindrical surface 30. As seen best in FIG. 2, the planar surfaces 29 may be considered as lying in two planes 31 which are parallel to and spaced equal distances from (but at opposite sides of) an axial plane 32 which extends through and contains axis 15, and therefore extends diametrically across body 17. Partial cylindrical or arcuate surfaces 30 are centered about axis 15, and as seen best in FIG. 3, form upper continuations of inner surface 24 of the body, at the same diameter as that surface 24.

The stud element proper, designated by the numeral 18, has an axially extending shank portion 32 which projects upwardly or axially outwardly from and beyond body 17, and has external threads 33 at its upper or axially outer end for engagement with a nut, to connect the nut through the medium of the assembly 10 to carrier part 11. In the FIG. 1 centered position of stud 18, threads 33 are centered about the same axis 15 as is body 17. Beneath or axially inwardly of threads 33, the stud may have an external cylindrical surface 34 of approximately the same diameter as threads 33, and centered about the axis of those threads. This cylindrical surface 34 continues axially inwardly through flange 25 of the body, and to the location of a transverse upper shoulder surface 35 formed at the upper or axially outer end of an enlarged portion 36 of the stud. This enlargement 36 is desirably integral with shank 32 of the stud, with this entire part usually being formed of an appropriate metal, such as a suitable steel.

The enlargement 36 formed at the lower end of stud 18 may have an outer cylindrical surface 37, centered about the axis 15 in the illustrated centered position of the stud, and of a diameter substantially smaller than the diameter of internal surface 24 of the body, so that the enlargement is free for transverse shifting movement within the body in any direction. At its lower end, the enlargement may have a planar surface 38 disposed transversely of axis 15, and spaced upwardly above flange 23 of the body. The upper surface 35 of enlargement 36 is disposed transversely of axis 15, and is annular except at the location of two lugs 39 formed on the stud at the juncture of its shank portion 32 and its enlarged portion 36. These lugs 39 are formed integrally with the rest of the stud, and project axially outwardly or upwardly from and beyond enlargement 36, and radially outwardly from and beyond shank 32. More specifically, each lug may be defined at its radially outer side by an outer partial cylindrical surface 40 which in the FIG. 1 position is centered about axis 15, and has a diameter corresponding to that of external surface 37 of the enlargement, to form in effect an upper continuation of surface 37. At their upper ends, lugs 39 have upper surfaces 41 which are planar and disposed transversely of axis 15, and extend outwardly from surface 34 to the diameter of surface 40. The opposite sides of lugs 39 are defined by parallel planar surfaces 42 which extend axially and are offset equally in opposite directions from axial plane 321 of FIG. 2. These surfaces 42, like surfaces 41, extend radially outwardly from the diameter of cylindrical surface 34 to the diameter of cylindrical surfaces 40, and they also extend axially from the plane of surface 35 to the plane of surfaces 41.

Figure 2:
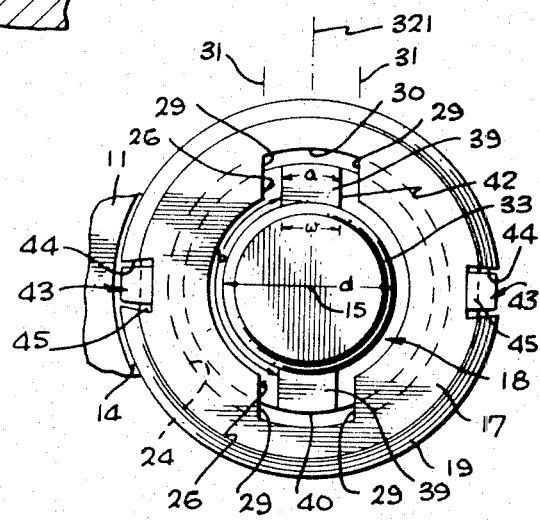
FIG. 2 is a plan view taken on line 2—2 of FIG. 1.

As will be apparent from FIG. 2, lugs 39 fit loosely within notches or passages 26 in flange 25 of the outer body, to enable shifting movement of the stud transversely of axis 15 in any direction from the FIG. 2 position. Also, the diameter of outer surface 34 of the shank is substantially smaller than the diameter of internal surface 28 of body flange 25, so that the shank is free for the desired transverse shifting movement.

The stud is yieldingly urged upwardly in FIG. 1 by a spring 421, which bears upwardly against surface 38 of the stud enlargement, and downwardly against body flange 23, in a relation yieldingly maintaining upper surface 35 of the enlargement in engagement with transverse stop surface 27 at the underside of flange 25 of the body. Spring 421 may be of any convenient type, and is typically illustrated as an annular Bellville type spring. A coil spring could instead be substituted, or a spring similar to that illustrated but having an altered configuration increasing its resilience, as by providing waves or slits in the spring element in well known manner.

Body 17 may be adapted to be locked permanently in its FIG. 1 position within a carrier part, by means of any convenient type of locking element or locking cement.

Preferably, I utilize for this purpose one or more (desirably two) locking keys 43 of the general type covered in my U.S. Patent No. 2,855,970, issued October 14, 1958, on "Insert Having Frictionally Retained Key Which Upsets Threads of Base Member." These keys are received within a pair of grooves 44 which are formed in the outer surfacce of body 17, and extend axially along that body and through threads 19 at two diametrically opposite locations. Grooves 44 have the dovetail or undercut cross sectional configuration illustrated in FIG. 2, and initially carry keys 43 in the positions illustrated in FIG. 1. In this position, each of the keys has an axially inner portion 45 which is radially relatively thin, to be received in only the radially inner portion of the associated groove 44, at a location such that it is received entirely within the minor diameter of carrier part threads 13, to enable the assembly to be screwed into the carrier part to the position of FIG. 1 without interference being offered by portion 45 of the keys. The axially outer ends of the keys form radially thickened portions 46, which project radially outwardly far enough to engage countersink surface 14 of the carrier part in the FIG. 1 position, in a relation automatically limiting the advancement of body 17 into the carrier part at this position (in which position outer surface 20 of body 17 is preferably inset slightly beneath the plane of carrier part surface 16). The keys are adapted to then be driven axially (downwardly in FIG. 1) to the broken line position illustrated at 47 in FIG. 1, to cut into the material of the carrier part in a manner locking body 17 against unscrewing rotation.

Figure 3:
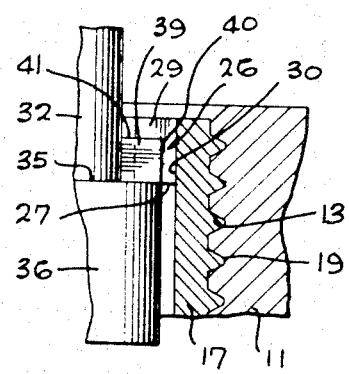
FIG. 3 is a fragmentary axial section taken on line 3—3 of FIG. 1.

In placing the device of FIGS. 1 to 3 in use, the first step is of course to screw body 17 into carrier part 11 to the FIG. 1 position, and to then drive keys 43 downwardly until they are flush with outer surface 16 of the carrier part, to lock body 17 against unscrewing rotation. A nut or other internally threaded part may then be connected onto external threads 33 of the stud, in order to make a connection through the stud to the carrier part. The stud is free to shift transversely of axis 15 relative to body 17, in any direction from the centered position of FIGS. 1 and 2, and until outer surface 37 of the stud enlargement engages internal surface 24 of the body. Thus, the stud may align itself, within limits, with any part to which it is to be connected.

Axially outward load forces are transmitted from stud 18 to body 17 by engagement of surfaces 35 on the stud with stop surfaces 27 formed in the body. Desirably, the parts are so dimensioned as to enable surfaces 35 and 27, in all positions to which the stud may be shifted, to remain in contact with one another along the entire circular extent of flange 25 except at the locations of notches 26.

The stud is retained against rotation by engagement of lugs 39 with the side walls 29 of notches 26 in flange 25 of body 17. The lugs and notches are preferably so dimensioned that both lugs are received in interfitting relation with their respective notches 26 in all positions to which the stud is shiftable, to thus very effectively prevent rotation of the stud. Spring 421 serves the purpose of holding surfaces 35 and 27 against one another, so that the axis of the stud is always parallel to main axis 15 of the outer body 17, in all positions of the stud. If this feature is not considered necessary for a particular use, spring 421 may in that instance be omitted from the device.

Figure 4:
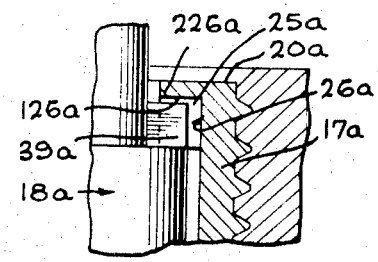
FIG. 4 is a view similar to FIG. 3, but showing a variational form of the invention.

FIG. 4 is a view similar to FIG. 3, but shows a slightly variational arrangement in which notches 26a formed in flange 25a of body 17a do not extend through the entire axial extent of flange 25a, but rather terminate upwardly at a transverse wall surface 126a, spaced beneath the plane of upper end surface 20a of the body, to form an axially reduced thickness portion 226a of the flange acting in effect to close the upper end of each of the notches 26a. The lugs 39a of stud 18a are identical with lugs 39 of FIGS. 1 to 3, and are received within the short notches 26a beneath portions 886a of flange 25a. The continuation of the flange at locations 226a, to that the flange is circularly continuous, increases the strength of the flange and its resistance to inward collapse, and therefore increases the pull-out resistance and removal torque of the installed stud assembly. Further, when the flange is uninterrupted at 226a, the notches 26a are not visible from the upper end of the device, to thus improve the external appearance of the device, so that flnage 25a then gives the appearance of a fully annular flange.

In both of the above discussed forms of the invention, it is preferred that the arcuate extent $a$ of each lug 39 or 39a about axis 15 (see FIG. 2) be small as compared with the arcuate extent $b$ of each surface 35. Similarly, the combined arcuate extent of both lugs 39 should be small as compared with the combined arcuate extent of the two surfaces 35. Further, it is desirable that the width $w$ of the lug generally circularly about axis 15 be substantially smaller than the diameter $d$ of surface 34 of the shank at the axial location of the lugs.

FIGS. 5 to 8 illustrate another form of the invention, consisting of a self-aligning internally threaded insert or nut assembly 10', as the assembly appears after having been screwed into a carrier part 11'. This carrier part contains a passage 12' having internal threads 13' centered about an axis 14', and having a tapering countersink surface 15' at the outer end of the threads.

The insert assembly itself includes an outer essentially tubular body 16' containing a relatively shiftable self-aligning nut element 17'. In use, an externally threaded stud represented at 18' in FIG. 7 is connected into the interior of the assembly and attached to nut element 17' to form a connection to carrier part 11' through the medium of the insert assembly 10'.

Tubular body 16' has external threads 19' which are shaped and dimensioned in correspondence with internal threads 13', to screw into those threads as illustrated in the figures. As in the first form of the invention, the external threads 19' are interrupted at one or more locations (preferably two diametrically opposite locations as shown) by grooves 20' extending along the outer surface of body 16' parallel to axis 14'. These grooves have a dovetail cross section for receiving and holding a pair of locking keys 21' corresponding to the keys 43' of FIG. 1, with the keys having thin axially inner portions 22' and radially thicker portions 24' beyond the end surface 23' of body 16'. The keys are frictionally held in the FIG. 5 positions, and are drivable axially to cut into the threads of the carrier part in locking relation.

Internally, the tubular body 16' contains an inner cylindrical surface 25' centered about axis 14', and extending along the major portion of the length of body 16'. At its axially outer or upper end, body 16' has a radially inwardly projecting essentially annular flange 26', which is interrupted at two diametrically opposite locations to form a pair of recesses or notches 27' extending axially through the flange. At its axially inner side, the flange forms a shoulder surface 28 which is disposed directly transversely of axis 14', and is circularly continuous about axis 14' except at the locations of the two axially extending recesses or notches 27'. The radially inner surface of flange 26' is curved cylindrically at 29' about axis 14', and like surface 28' is interrupted only at the locations of recesses 27'. Similarly, there is formed at the upper or axially outer side of flange 26' the previously mentioned surface 23', which is disposed transversely of axis 14', and again is interrupted only by recess 27'. At its lower end as seen in FIG. 5, the body may initially be formed with an annular thin walled bottom portion of the cylindrical configuration illustrated in broken lines at 30', which portion is ultimately deformed annularly radially inwardly to form a circular transverse flange 31' for retaining the nut element 17' against removal from body 16'.

The nut element itself has an outer cylindrical surface 32' which in the illustrated centered position of the nut is disposed about axis 14' of the body, but is of a diameter substantially smaller than that of internal surface 25' of the body, to allow for transverse shifting movement of the nut element 17' in any direction within and relative to the body. Internally, the nut element contains threads 33', which again in the FIG. 5 position are centered about axis 14', and are designed to mate with the threads of stud 18' shown in FIG. 7. To enable the stud to pass into and through the nut element 17' in any of the various positions to which these parts may be shifted transversely, surface 29' of flange 26', and also inner cylindrical surface 34' of flange 31', are of a diameter substantially greater than the major diameter of internal threads 33' of the nut, and therefore greater than the major diameter of the threads of screw or stud 18', but of course less than the diameter of external surface 32' of the nut.

At its lower end, nut element 17' has a transverse bottom surface 35' which is engageable with the upper transverse surface of flange 31' in all positions of the nut element, to retain the nut against removal from the body. At its upper end, element 17' has axial load transmitting shoulders or surfaces 36', which are disposed directly transversely of axis 14', and which engage against surfaces 28' of the outer body in a manner such that those surfaces 28' function as stop surfaces for preventing upward or axially outward movement of the nut element relative to body 16' beyond the position of FIG. 7. The two surfaces 36' of nut element 17' are each approximately semi-cylindrical, and are essentially complementary, to form together an essentially annular transverse load transmitting shoulder which is interrupted only at the locations of two diametrically opposite lugs 37' formed by the outer end of the nut. Each of these lugs may have the essentially rectangular configuration illustrated in FIG. 5, as viewed looking outwardly toward the lug from axis 14'. More particularly, each lug may have two parallel planar opposite side surfaces 38', extending parallel to and offset equal distances at opposite sides of a plane 39' which extends radially outwardly from and contains the axis of the nut. At its upper end, each lug may have a top transverse planar surface 40'. Also, as seen best in FIG. 6, the lugs as viewed when looking axially toward them may have essentially arcuate configurations, being defined at their outer sides by radially outer surfaces 41' forming continuations of outer surface 32' of the nut, and being defined at their inner sides by arcuate partial cylindrical surfaces 42' centered about axis 14' and of a diameter corresponding to the major diameter of threads 33'.

Lugs 37' project into recesses or notches 27' in flange 26' in a manner effectively locking the nut against rotation relative to outer body 16'. However, the lugs have a dimension $d$ (FIG. 6) circularly about axis 14' which is substantially smaller than the corresponding dimension $e$ of recesses 27' to allow for the desired shifting movement of the nut element. To define the recesses 27' more specifically each of these recesses may have two opposite side wall surfaces 43' which are planar and parallel to axis 14', but offset equally at opposite sides of plane 39' of FIG. 6. At its radially outer side, each of the recesses 27' may have an outer wall surface 44' forming a partial cylindrical continuation of surface 25' of the body.

It is noted that the lugs 37' may in essence be considered as forming circularly between these lugs a pair of notches 137' extending axially into the material of nut element 17' from the outer end of that nut element, and extending radially through the entire thickness of the tubular side wall of the nut. More specifically, each of these notches is defined at its axially inner end by one of the surfaces 36', and at its opposite sides by two of the side surfaces 38' of the lugs. Preferably, the circular extent $x$ of each of these notches is substantially greater than (for best results at least about three times as great as) the circular extent $d$ of each lug, so that the axial force transmission area of surfaces 36' and 28' may be great enough to take substantial axial load forces when the device is in use. Similarly, the combined circular extents of the notches should desirably be substantially greater than (optimally at least about three times as great as) the combined circular extents of the lugs. Also, it is noted that the width $w'$ of each lug 27' is preferably substantially smaller than (desirably not greater than about one-half of) the minor diameter $y$ of internal threads 33' of the nut element.

In using the insert 10' of FIG. 5, the first step is of course to screw body 16' into carrier part 11' to the position illustrated in FIG. 5, following which keys 21' are driven downwardly by a hammer or other tool to the position of FIG. 7, to cut through the threads of the carrier part in a manner effectively locking body 16' against unscrewing rotation from part 11'. A screw 18' may then be connected into threads 33' of nut element 17', in any of the different positions to which the nut element is transversely shiftable. During connection of the screw into the nut element, the latter is retained against rotation by engagement of lugs 37' with the sides of recesses 27' in the body, while axially outward load forces are transmitted to the body from the nut element through engaging transverse surfaces 28' and 36'. The parts are desirably so dimensioned that surfaces 28' and 36' will contact throughout their entire arcuate extents in any position to which the nut element may be shifted.

FIG. 9 corresponds to a portion of FIG. 7, and shows a variational form of the insert which may be considered as identical with that of FIGS. 5 to 8 except that the two recesses 27d within which lugs 37d are movably received do not continue axially outwardly through the entire thickness of flange 26d of the outer tubular body. Instead, the recesses terminate at axially outer transverse wall surfaces 127d, so that flange 26d is completely annular and uninterrupted at its outer end 126d. As in the similar arrangement shown in FIG. 4, the FIG. 9 variation has the advantage of increasing the strength of flange 26d, and additionally of concealing recesses 27d from view at the outer end of the insert, to thus improve the overall appearance of the insert assembly.

I claim:
1. A self-aligning stud assembly comprising an outer hollow body adapted to be connected into a carrier part, a stud mounted partially within and movably carried by said body and having a shank projecting axially outwardly from and beyond the body, said shank having external threads axially outwardly beyond the body for engagement with internal threads of a nut or the like to secure the nut through said assembly to the carrier part, said stud having an enlargement within the body which is larger transversely of the axis of said threads than is said shank, said stud being a loose fit transversely within the body and free for self aligning shifting movement generally transversely of said axis and relative to the body between any of a plurality of different positions, said body having a flange projecting radially inwardly at essentially the juncture of said shank and said enlargement and presenting an axially inwardly facing stop surface at its axially inner side, said enlargement having an axially outwardly facing shoulder surface at said juncture of the shank and enlargment engageable with said stop surface of the flange in any of said different positions of the stud in a relation limiting axially outward movement of the stud and slidably movable relative to said stop surface between said different positions, said flange containing a notch at a localized area about its circular extent extending axially outwardly into the flange beyond said stop surface and also extending radially outwardly into the flange, said stud having a lug at said juncture of the shank and enlargement projecting axially outwardly from said enlargement and beyond said shoulder surface and alongside said shank and also projecting radially outwardly from and beyond said shank into said notch in a loosely fitting relation preventing rotation of the stud relative to the body but allowing said relative transverse shifting movement of the stud.

2. A self-aligning stud assembly as recited in claim 1, including yielding means urging said stud axially relative to said body.

3. A self aligning stud assembly as recited in claim 1, including a spring in said body yieldingly urging said stud axially outwardly relative to the body and urging said shoulder surface against said stop surface.

4. A self-aligning stud assembly as recited in claim 1, in which there are two of said notches formed in said flange at diametrically opposite locations, and two of said lugs formed on said stud at diametrically opposite locations and movably received within said notches respectively.

5. A self-aligning stud assembly as recited in claim 1, in which said body has external threads adapted to be screwed into internal threads in the carrier part.

6. A self-aligning stud assembly as recited in claim 1, in which said body has external threads adapted to be screwed into internal threads in the carrier part, there being at least one locking element adapted to be driven axially relative to said body and operable when so driven to lock the body against unscrewing rotation from the carrier part.

7. A self-aligning stud assembly as recited in claim 1, in which said lug has a width generally circularly about said axis which is smaller than the minimum transverse thickness of the shank adjacent the lug.

8. A self-aligning stud assembly as recited in claim 1, in which said stop surface and said shoulder surface are both generally annular and disposed substantially directly transversely of said axis.

9. A self-aligning stud assembly as recited in claim 1, in which said body has external threads adapted to be screwed into internal threads in the carrier part, there being at least one locking key carried by the body and adapted to be driven axially relative to the body and operable when so driven to lock the body against unscrewing rotation from the carrier part, there being two of said notches formed in said flange at diametrically opposite locations with two of said stop surfaces therebetween, there being two of said lugs formed on said stud at diametrically opposite locations and movably received within said notches respectively with two of said shoulder surfaces between the two lugs, said stop surfaces and said shoulder surfaces extending essentially annularly about said axis and about said shank and being disposed substantially directly transversely of said axis.

10. A self-aligning stud assembly as recited in claim 9, including a spring at the axially inner end of said enlargement bearing axially outwardly thereagainst, and a second flange on said body turned radially inwardly at the axially inner end of the body and against which said spring bears axially inwardly.

11. A self-aligning threaded insert for connection to a coacting screw, comprising an essentially tubular outer body to be mounted to a carrier part, a nut element contained within said outer body and having an essentially tubular side wall containing internal threads into which said screw is connectible from an axially outer end of the body and nut element, said nut element being a loose fit transversely within said body and free for self aligning shifting movement relative to said body transversely of the axis of said threads to a plurality of different positions, said body having at said axially outer end of the nut element a flange projecting radially inwardly and presenting a stop surface disposed substantially directly transversely of said axis and facing axially inwardly toward the nut element and slidably engageable by said nut element to limit axially outward movement thereof, said flange containing at least one recess extending axially outwardly thereinto from the plane of said stop surface to a location axially outwardly beyond said plane, said side wall of the nut element forming at said axially outer end thereof at least one lug projecting axially outwardly into said recess in a loosely interfitting relation preventing rotation of the nut element in said body but permitting said relative shifting movement of the nut element, said side wall of the nut element containing at least one notch extending axially inwardly thereinto at a location offset circularly from said lug and extending entirely through the radial thickness of said tubular wall, said notch being defined at its axially inner end by a load transmitting surface beyond which said lug projects axially outwardly and which is disposed substantially directly transversely of said axis and is engageable axially outwardly against said stop surface to transmit axially outward load forces to said body in different ones of said positions.

12. A self-aligning threaded insert as recited in claim 11, in which there are two of said recesses and two of said lugs at diametrically opposite locations, said lugs defining two of said notches in the nut element at diametrically opposite locations.

13. A self-aligning threaded insert as recited in claim 11, in which said outer body has external threads formed on the outer surface thereof and centered about an axis which is parallel to said axis of the nut element for connection into a threaded recess in said carrier part.

14. A self-aligning threaded insert as recited in claim 11, in which said outer body has external threads formed on the outer surface thereof and centered about an axis which is parallel to said axis of the nut element for connection into a threaded recess in said carrier part, there being means for locking said threads of the outer body within said recess in the carrier part.

15. A self-aligning threaded insert as recited in claim 11, in which said outer body has external threads formed on the outer surface thereof and centered about an axis which is parallel to said axis of the nut element for connection into a threaded recess in said carrier part, said external threads containing at least one groove extending axially thereinto, there being a key carried by said outer body and drivable axially within said groove for locking the outer body against unscrewing rotation relative to the carrier part.

11, in which said lug has a maximum width transversely of said axis which is substantially less than the minor diameter of said internal threads.

17. A self-aligning threaded insert as recited in claim 11, in which said lug has an extent circularly about said axis which is substantially smaller than the circular extent of said notch.

18. A self-aligning threaded insert as recited in claim 11, in which there are a plurality of said lugs and a plurality of said notches therebetween, said lugs having a combined circular extent smaller than the combined circular extent of said notches.

19. A self-aligning fastener assembly comprising an externally threaded outer hollow body adapted to be connected into a carrier part, an element mounted at least partially within and movably carried by said body and having threads for engagement with a coacting member to secure said member through said assembly to the carrier part, said element having an external diameter considerably less than the internal diameter of the surrounding portion of said body and being a loose fit transversely within the body and free for self aligning shifting movement generally transversely of the axis of said threads and relative to the body between any of a plurality of different positions, said body having a generally circular flange projecting radially inwardly and presenting an axially inwardly facing stop surface at its axially inner side disposed substantially normal to said axis, said element having an axially outwardly facing shoulder surface having a maximum diameter greater than the minimum diameter of said flange and also disposed substantially normal to said axis and engageable with said stop surface of the flange in any of said different positions of the element in a relation limiting axially outward movement of the element, said flange containing at least one notch at a localized area about its circular extent extending axially outwardly into the flange and beyond said stop surface, said element having a lug projecting axially outwardly beyond said stop surface and beyond said shoulder surface into said notch in a loosely fitting relation preventing rotation of said element relative to the body but allowing said relative transverse shifting movement of the element, the axial extent of said notch being at least as great as that of said lug, whereby said shoulder surface is engageable with said stop surface to transmit axially outward load forces to said body different ones of said positions.

20. A self-aligning fastener assembly as recited in claim 19, including a spring yieldingly urging said element axially outwardly relative to said body to maintain said shoulder surface in sliding engagement with said stop surface.

References Cited

UNITED STATES PATENTS

| | | | |
|---|---|---|---|
| 2,639,179 | 5/1953 | Phelps | 151—41.76 |
| 2,643,696 | 6/1953 | Misch | 151—19 |
| 2,988,855 | 6/1961 | Asfour et al. | 151—69 |
| 3,177,916 | 4/1965 | Rosan | 151—41.73 |
| 3,233,645 | 2/1966 | Neuschotz | 151—23 |

CARL W. TOMLIN, *Primary Examiner.*

R. S. BRITTS, *Assistant Examiner.*

U.S. Cl. X.R.

151—41.76